(12) United States Patent
Nakamura et al.

(10) Patent No.: US 12,512,261 B2
(45) Date of Patent: Dec. 30, 2025

(54) SURFACE-MOUNT CAPACITOR

(71) Applicant: ELNA CO., LTD., Tokyo (JP)

(72) Inventors: Tadahiro Nakamura, Fukushima (JP); Kaori Matsumura, Fukushima (JP); Naozumi Kimura, Kuroishi (JP)

(73) Assignee: ELNA CO., LTD., Tokyo (JP)

( * ) Notice: Subject to any disclaimer, the term of this patent is extended or adjusted under 35 U.S.C. 154(b) by 230 days.

(21) Appl. No.: 18/280,401

(22) PCT Filed: Mar. 30, 2022

(86) PCT No.: PCT/JP2022/015791
§ 371 (c)(1),
(2) Date: Sep. 5, 2023

(87) PCT Pub. No.: WO2022/210826
PCT Pub. Date: Oct. 6, 2022

(65) Prior Publication Data
US 2024/0120150 A1    Apr. 11, 2024

(30) Foreign Application Priority Data

Mar. 31, 2021  (JP) ................. 2021-060482
Jan. 27, 2022  (JP) ................. 2022-010732
Mar. 23, 2022  (JP) ................. 2022-046447

(51) Int. Cl.
*H01G 2/06* (2006.01)
*H01G 9/008* (2006.01)

(52) U.S. Cl.
CPC .............. *H01G 2/06* (2013.01); *H01G 9/008* (2013.01)

(58) Field of Classification Search
CPC ............ H01G 9/10; H01G 9/008; H01G 2/06
See application file for complete search history.

(56) References Cited

U.S. PATENT DOCUMENTS

| | | | |
|---|---|---|---|
| 2003/0123217 A1 | 7/2003 | Nakamura et al. | |
| 2008/0117567 A1* | 5/2008 | Nakamura | H01G 9/008 361/537 |
| 2008/0130201 A1 | 6/2008 | Kodera | |
| 2012/0162860 A1* | 6/2012 | Taketani | H01G 9/012 29/832 |

(Continued)

FOREIGN PATENT DOCUMENTS

| | | | |
|---|---|---|---|
| JP | 2000021682 A | * | 1/2000 |
| JP | 2001-176752 A | | 6/2001 |
| JP | 2002-025859 A | | 1/2002 |

(Continued)

OTHER PUBLICATIONS

PCT/ISA/210, "International Search Report for PCT International Application No. PCT/JP2022/015791," Aug. 2, 2022.

*Primary Examiner* — David M Sinclair
(74) *Attorney, Agent, or Firm* — HAUPTMAN HAM, LLP

(57) ABSTRACT

In a chip type capacitor formed by attaching a seat plate to a capacitor, generation of voids or cracks due to flux gas generated at the time of soldering is suppressed. When providing auxiliary terminals for increasing the soldering strength on a seat plate for chipping, which enables a lead same direction type capacitor to be surface mounted, a gas release groove, preferably formed as a slit to release flux gas generated at the time of soldering, is formed on each of the auxiliary terminals.

5 Claims, 16 Drawing Sheets

(56) References Cited

U.S. PATENT DOCUMENTS

2020/0251288 A1   8/2020   Koyanagi

FOREIGN PATENT DOCUMENTS

| | | | |
|---|---|---|---|
| JP | 2008-141079 | A | 6/2008 |
| JP | 2008-244033 | A | 10/2008 |
| JP | 2009170756 | A * | 7/2009 |
| JP | 2012-138414 | A | 7/2012 |
| JP | 2015-023096 | A | 2/2015 |
| JP | 2015-228405 | A | 12/2015 |
| JP | 2019-102604 | A | 6/2019 |
| JP | 2020-123711 | A | 8/2020 |

\* cited by examiner

Fig.8
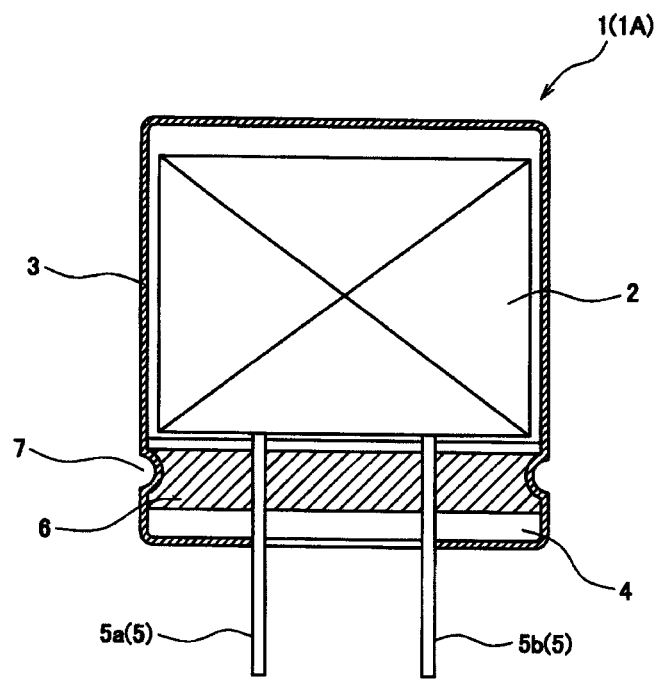
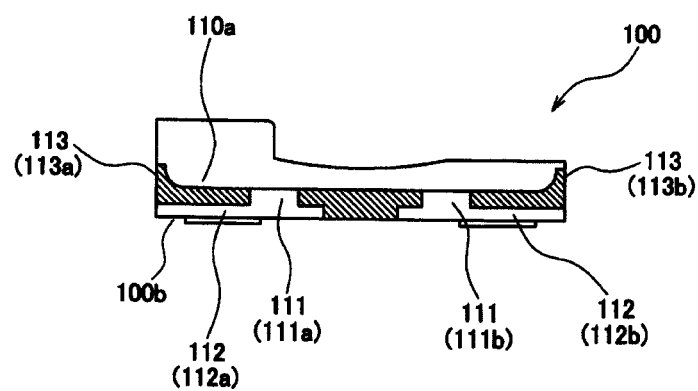

Fig.13
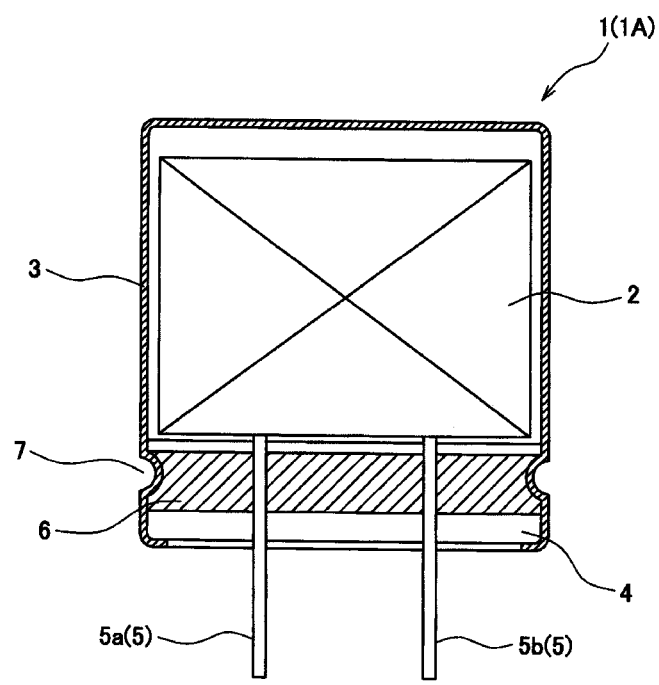
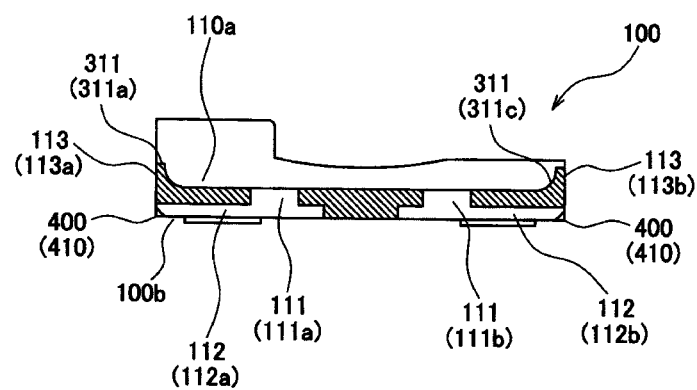

SURFACE-MOUNT CAPACITOR

RELATED APPLICATIONS

The present application is National Phase of International Application No. PCT/JP2022/015791 filed Mar. 30, 2022, and claims priority from Japanese Applications No. 2021-060482, filed Mar. 31, 2021; No. 2022-010732, filed Jan. 27, 2022; and No. 2022-046447, filed Mar. 23, 2022, the disclosures of which are hereby incorporated by reference herein in its entirety.

TECHNICAL FIELD

The present invention relates to a surface-mount capacitor, which enables an aluminum electrolytic capacitor to be surface mounted on a circuit board, and a seat plate for surface mounting.

BACKGROUND ART

In order to enable surface mounting to a circuit board, in a lead same direction type (also called a discrete type) aluminum electrolytic capacitor, in which a pair of lead terminals are led out in a same direction from a sealing part of a bottomed cylindrical outer case with a capacitor element built therein, processes are performed to make the capacitor a surface-mount (chip) type capacitor, by mounting a seat plate, which is made of a synthetic resin and has a pair of lead terminal insertion holes, on a sealing part side of the outer case, and bending the lead terminals, which are led out to a bottom surface side of the seat plate through the lead terminal insertion holes, in opposite directions away from each other.

In a lot of cases, this type of chip type (surface-mount type) capacitor is soldered to a circuit board by a reflow soldering method, and in particular, in a chip type capacitor for a vehicle where high vibration resistance is required, the soldering strength is increased by providing auxiliary terminals on a bottom surface of the seat plate (for example, refer to Patent Literature 1 and Patent Literature 2).

As is well known, flux gas (gasified flux) is generated at the time of soldering, and there may be cases where voids or cracks occur due to flux gas remaining in a fillet. Voids or cracks of this type impair the reliability of a solder joint.

Moreover, there may be cases where solder paste applied to a solder land part is pushed to the outside of the solder land part by the generated flux gas, becomes spherical due to heat at the time of soldering, solidifies into a solder ball, and adheres, for example, to a solder mask (also called a solder resist or the like) of the circuit board or to the seat plate of this product.

Moreover, as another example rather than the one resulting from flux gas, at the time of mounting to a circuit board, there may be cases where solder paste applied to a solder land part is crushed by the lead terminals, the area of this crushed part expands, solder does not return to the solder land part when melted due to heat at the time of soldering, and remains as a solder ball outside the solder land part. Such an undesirable phenomenon occurs, regardless of the presence or absence of auxiliary terminals.

In addition, in a conventional chip type capacitor, since auxiliary terminals are arranged on a bottom surface of a seat plate, there is a problem in which the quality (propriety) of a solder fixing state of the auxiliary terminals is difficult to judge from the outside after soldering.

CITATION LIST

Patent Literature

Patent Literature 1: Japanese Patent Laid-Open No. 2008-244033

Patent Literature 2: Japanese Patent Laid-Open No. 2012-138414

SUMMARY OF INVENTION

Technical Problem

Accordingly, a first object of the present invention is, in a surface-mount capacitor formed by attaching a seat plate for surface mounting (chipping) to an aluminum electrolytic capacitor, to suppress voids and cracks, a solder ball or the like, which impair the reliability of a product, from occurring at the time of soldering.

Moreover, a second object of the present invention is, in a surface-mount capacitor formed by attaching a seat plate for surface mounting (chipping) to an aluminum electrolytic capacitor, to enable the quality of soldering to a circuit board to be visually judged.

Solution to Problem

In order to address the first object, a first invention is a surface-mount capacitor that includes a capacitor main body from which a pair of lead terminals are led out in a same direction from a sealing part of a bottomed cylindrical outer case with a capacitor element built therein, and a synthetic resin seat plate mounted on a sealing part side of the outer case, in which the seat plate has a pair of lead terminal insertion holes through each of which one of the lead terminals is inserted, lead terminal housing grooves extending from each of the lead terminal insertion holes to opposite side edges of the seat plate in opposite directions away from each other are formed on a bottom surface of the seat plate, and auxiliary terminals that are integrated with the lead terminals at the time of soldering are embedded along each of the lead terminal housing grooves, each of the lead terminals is inserted into one of the lead terminal insertion holes, a distal portion of each of the lead terminals is housed within one of the lead terminal housing grooves by being bent, and is soldered at a prescribed position of a circuit board together with one of the auxiliary terminals, and a gas release groove for releasing flux gas generated at the time of the soldering is formed on each of the auxiliary terminals.

Moreover, in order to address the first object, a second invention is a surface-mount capacitor that includes a capacitor main body from which a pair of lead terminals are led out in a same direction from a sealing part of an outer case with a capacitor element built therein, and a synthetic resin seat plate mounted on a sealing part side of the outer case, in which the seat plate has a pair of lead terminal insertion holes through each of which the lead terminals are inserted, and lead terminal housing grooves extending from each of the lead terminal insertion holes to opposite side edges of the seat plate in opposite directions away from each other are formed on a bottom surface of the seat plate, each of the lead terminals is inserted into one of the lead terminal insertion holes, and is soldered to a solder land part formed on a circuit board in a state where housed within one of the lead terminal housing grooves by being bent, and a direction orthogonal to an extension direction of the lead terminal housing grooves is set as a width direction, and the lead terminal housing grooves each comprise a widened width part for forming a prescribed gap on both sides of each of the lead terminals, the widened width part being wider than a width of each of the lead terminals.

Moreover, in order to address the second object, a third invention is a surface-mount capacitor that includes a capacitor main body from which a pair of lead terminals are led out in a same direction from a sealing part of an outer case with a capacitor element built therein, and a synthetic resin seat plate mounted on a sealing part side of the outer case, in which the seat plate has a pair of lead terminal insertion holes through each of which the lead terminals are inserted, and lead terminal housing grooves extending from each of the lead terminal insertion holes to opposite sides of the seat plate in opposite directions away from each other are formed on a bottom surface of the seat plate, each of the lead terminals is inserted into one of the lead terminal insertion holes, and is soldered to a solder land part formed on a circuit board in a state where housed within one of the lead terminal housing grooves by being bent, and soldering auxiliary parts having a metal material and allowing a soldered state to be visually observed from outside are arranged adjacent to end parts of each of the lead terminal housing grooves on lower end edges of side surfaces of the seat plate.

Advantageous Effect of Invention

According to the first and second inventions, in a surface-mount capacitor formed by attaching a seat plate for surface mounting to an aluminum electrolytic capacitor, it is possible to suppress the occurrence of voids and cracks due to flux gas generated at the time of soldering.

Moreover, according to the third invention, in a surface-mount capacitor formed by attaching a seat plate for surface mounting to an aluminum electrolytic capacitor, it is possible to visually judge the quality of soldering to a circuit board.

BRIEF DESCRIPTION OF DRAWINGS

FIG. 8 is a front view showing a surface-mount capacitor relating to a second embodiment of the present invention separated into a capacitor main body and a seat plate for surface mounting, and showing each as a cross-section.

FIG. 13 is a front view showing a surface-mount capacitor relating to a third embodiment of the present invention separated into a capacitor main body and a seat plate for surface mounting, and showing each as a cross-section.

FIG. 15b is a perspective view showing a modified example of the soldering auxiliary parts of FIG. 15a.

FIG. 17b is a perspective view showing a modified example of the soldering auxiliary parts of FIG. 17a.

DESCRIPTION OF EMBODIMENTS

Next, while several embodiments of the present invention will be described by referring to the figures, the present invention is not limited to these embodiments.

First Embodiment (Embodiment of a First Invention)

Figure 2:
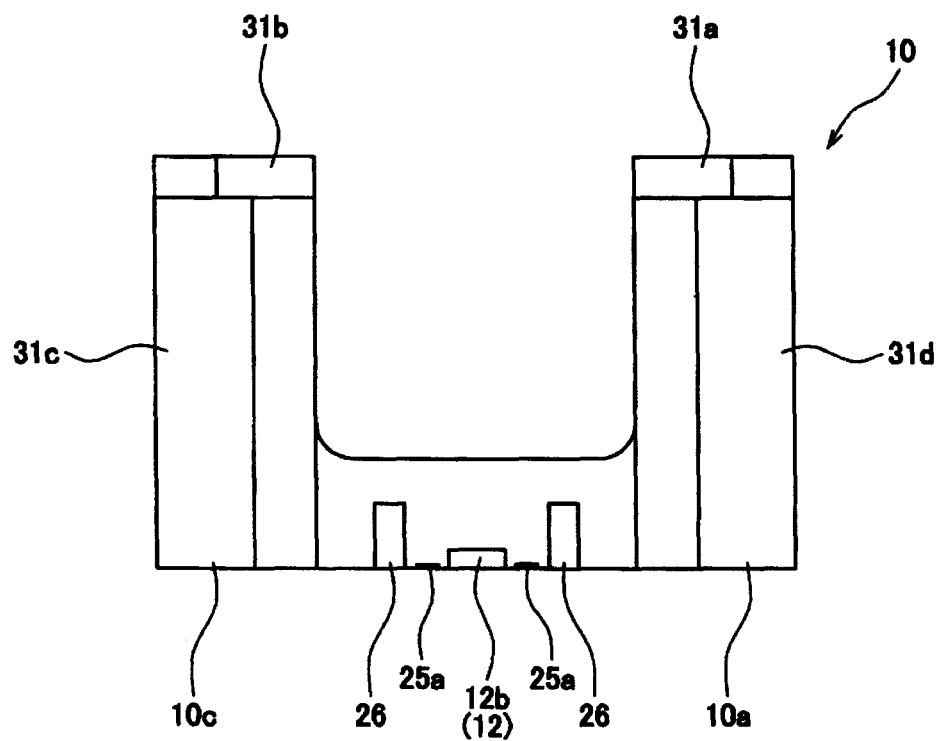
FIG. 2 is a right side view of the seat plate for surface mounting relating to the first embodiment.
Figure 3:
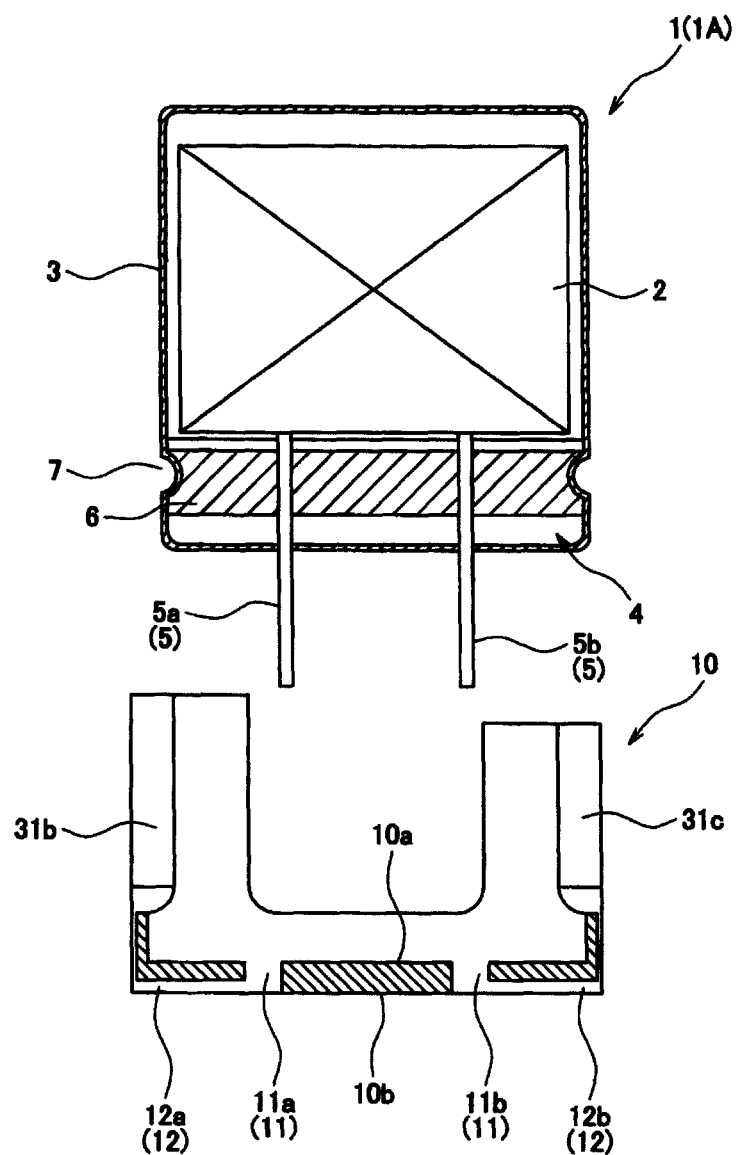
FIG. 3 is a front view showing, as a partial cross-section, an A-A line portion in FIG. 1 of the seat plate for surface mounting relating to the first embodiment, along with an aluminum electrolytic capacitor.

First, by referring to FIG. 1 to FIG. 3, in particular, FIG. 3, a seat plate 10 relating to a first embodiment is a seat plate for setting an aluminum electrolytic capacitor (hereinafter, also called a "capacitor main body") 1 as a chip type capacitor in a form that can be surface mounted to a circuit board or the like, which is not illustrated. Note that a seat plate for chipping of this type is also called a pedestal.

The capacitor main body 1 to which this seat plate 10 is applied is a lead same direction type (also called a discrete type) capacitor from which a pair of lead terminals 5a and 5b are led out in a same direction from a sealing part 4 of an outer case 3 with a capacitor element 2 built therein.

Normally, the outer case 3 has a bottomed cylindrical shape made of aluminum, and an opened part of the outer case 3 is closed by a rubber sealing body 6 formed from butyl rubber, for example, as the sealing part 4. In order to improve airtightness of the sealing part 4, lateral throttle grooves 7 are formed in the circumferential direction along the rubber sealing body 6 on the outer peripheral surfaces of the outer case 3.

In this example, the lead terminal 5a is on an anode side, the lead terminal 5b is on a cathode side, and both are led out to the outside through the rubber sealing body 6. Note that, in the case where it is not necessary to distinguish the lead terminals 5a and 5b, they will be collectively called the lead terminals 5.

Figure 1:
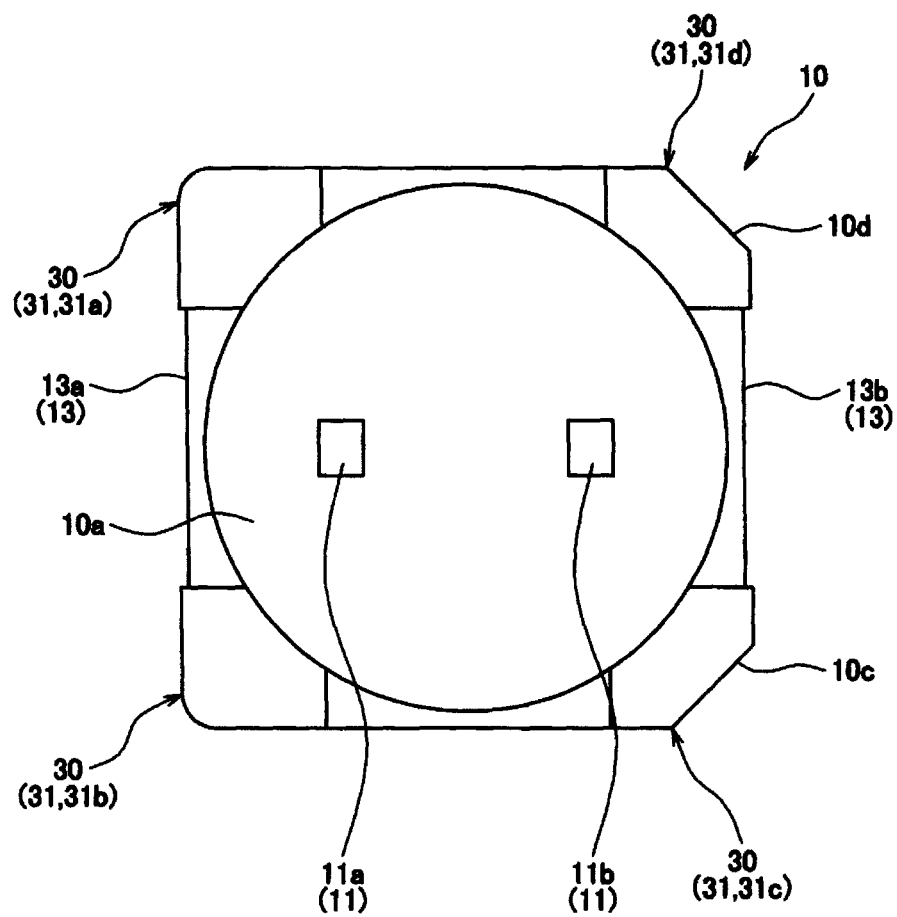
FIG. 1 is a plan view showing a seat plate for surface mounting of a chip type capacitor relating to a first embodiment of the present invention.
Figure 4:
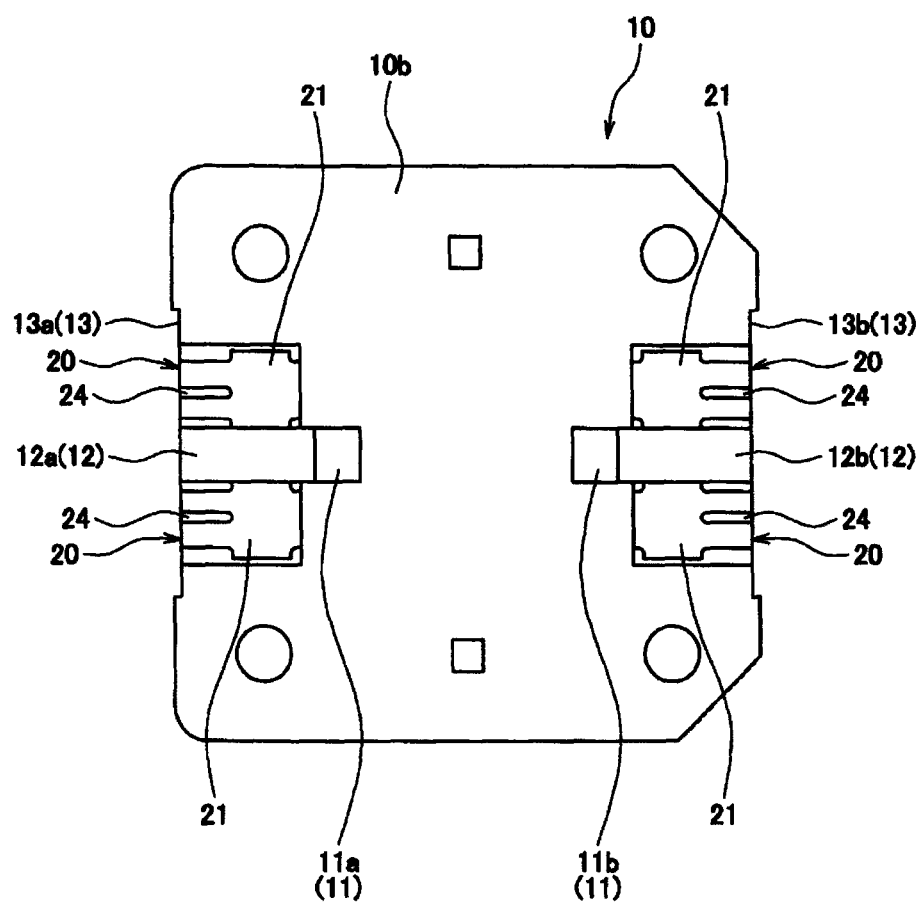
FIG. 4 is a bottom view showing the seat plate for surface mounting relating to the first embodiment.

The seat plate 10 has a square shape in which two adjacent corner parts are obliquely cut off in the plan view of FIG. 1, and the entire body is formed from a heat-resistant synthetic resin. FIG. 1 is a component mounting surface 10a side on which the capacitor main body 1 of the seat plate 10 is placed, and FIG. 4 is a bottom surface 10b side of the seat plate 10 opposite to a circuit board, which is not illustrated, at the time of soldering.

A pair of lead terminal insertion holes 11a and 11b, through which the lead terminals 5a and 5b are inserted, are bored into the seat plate 10. Note that, in the case where it is not necessary to distinguish the lead terminal insertion holes 11a and 11b, they will be collectively called the lead terminal insertion holes 11.

Lead terminal housing grooves 12a and 12b, which extend from each of the lead terminal insertion holes 11a and 11b to opposite side edges 13a and 13b of the seat plate 10 in opposite directions away from each other, are formed on the bottom surface 10b of the seat plate 10. In the case where it is not necessary to distinguish the lead terminal housing grooves 12a and 12b, they will be collectively called the lead terminal housing grooves 12. In the case where it is not necessary to distinguish the side edges 13a and 13b, they will be collectively called the side edges 13.

The capacitor main body 1 is placed on the component mounting surface 10a of the seat plate 10, while inserting the lead terminals 5a and 5b into the lead terminal insertion holes 11a and 11b, and thereafter the lead terminals 5a and 5b are housed within the lead terminal housing grooves 12a and 12b, by being bent in opposite directions away from each other. Therefore, the capacitor main body 1 can be set as a chip type capacitor 1A that can be surface mounted on a circuit board.

In a lot of cases, mounting to the circuit board is performed by reflow soldering, and auxiliary terminals 20 are used, in order to increase the soldering strength (mounting strength). In the first embodiment, the auxiliary terminals 20 are provided at a total of four locations on both sides of the lead terminal housing groove 12a and both sides of the lead terminal housing groove 12b, and are integrated with the lead terminals 5 by a soldering material at the time of soldering. In the present embodiment, the auxiliary terminals 20 are made of brass.

Figure 6:
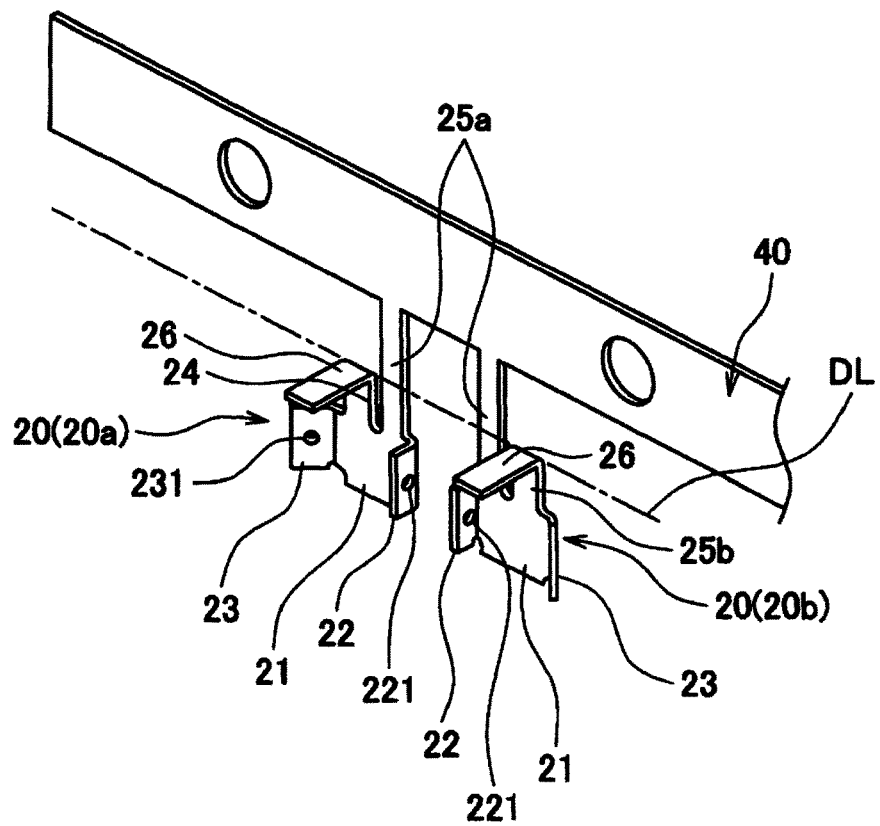
FIG. 6 is a perspective view showing auxiliary terminals attached to the seat plate for surface mounting relating to the first embodiment in a state where suspended on a hoop material.
Figure 7:
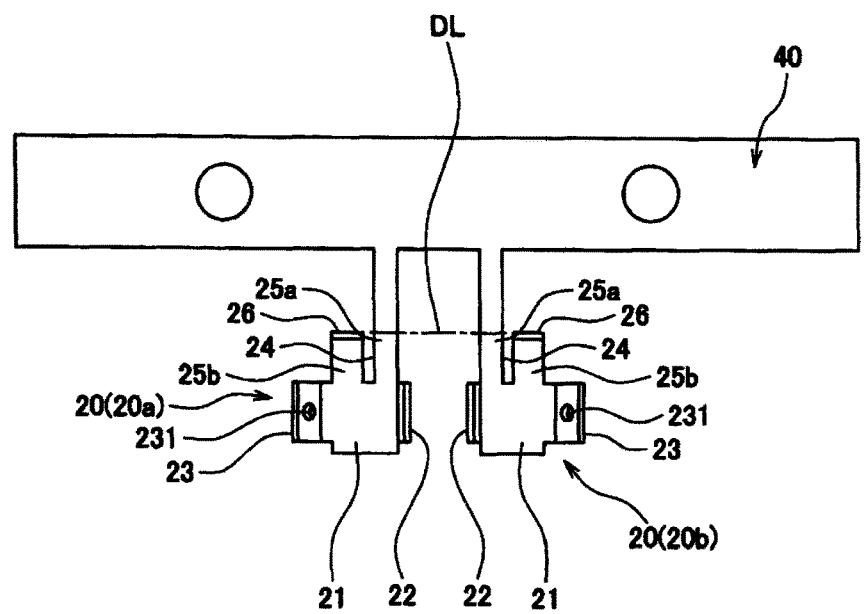
FIG. 7 is a front view of FIG. 6.

It is preferable for each of the auxiliary terminals 20 to be integrally embedded in the seat plate 10 by insert molding in a mold. Accordingly, as shown in FIG. 6 and FIG. 7, each of the auxiliary terminals 20 is conveyed inside the mold in a state where supported by a hoop material 40 as a pair of auxiliary terminals 20a and 20b, for each of the lead terminal housing grooves 12a and 12b. The auxiliary terminal 20a and the auxiliary terminal 20b are horizontally symmetrical, in a state where supported by the hoop material 40.

The auxiliary terminals 20 each include a main plate part 21 that occupies a large portion of the auxiliary terminal 20. The main plate part 21 is attached (embedded) on the side of the lead terminal housing groove 12 on the bottom surface 10b of the seat plate 10 so that the surface is exposed.

A flange piece 22 raised at a substantially right angle from the main plate part 21, so as to be exposed within the lead terminal housing groove 12, is formed on one side edge of the main plate part 21 facing the lead terminal housing groove 12. A hole 221, in which resin enters at the time of injection molding, is bored into the flange piece 22.

An anchor piece 23, which is bent obliquely upward so as to bite into the seat plate 10, is connected to the side edge of the main plate part 21 on an opposite side to the one side edge. A hole 231, in which resin enters at the time of injection molding, is bored into the anchor piece 23.

A gas release groove 24 for releasing flux gas generated at the time of soldering is formed on the main plate part 21. While it is preferable for this gas release groove 24 to be a slit, it may be gutter shaped with a groove bottom. Moreover, there may be a plurality of the gas release grooves 24.

In the first embodiment, the gas release groove 24 is formed from a central portion of the main plate part 21 to a side edge 113 (13a, 13b) of the seat plate 10. It is preferable for the area occupied by the gas release groove 24 in the main plate part 21 to be from 10% to 65% of the area of the main plate part 21 prior to the gas release groove 24 being formed.

Figure 5:
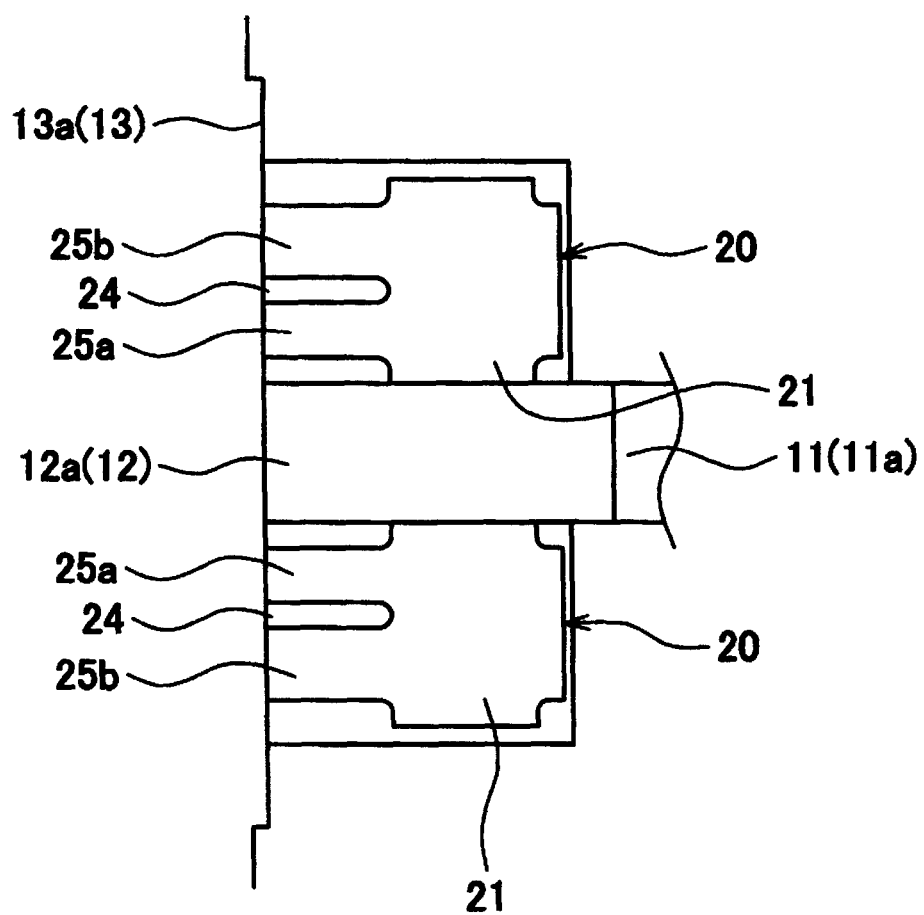
FIG. 5 is a main part enlarged view showing enlarged an auxiliary terminal portion of FIG. 4.

In the first embodiment, while the area occupied by the gas release groove 24 with respect to the main plate part 21 is to the extent of 20%, it is preferable for the proportion occupied by the gas release groove 24 with respect to the main plate part 21 to be optimized by the size of the seat plate 10 or the like. Moreover, in the present embodiment, while the end part of the gas release groove 24 is opened toward the side edge 13 of the seat plate 10, the gas release groove 24 may be formed toward an opposite side to this (right side in FIG. 5), or may be formed toward a side where there is no solder (lower side in FIG. 5).

The side edge 13 side of the seat plate 10 of the main plate part 21 is branched into two by the gas release groove 24, and from among these branch pieces 25a and 25b, a branch plate part 26 is provided on the branch piece 25b separated from the lead terminal housing groove 12. The branch plate part 26 is bent at a right angle from the branch piece 25b along a side piece 13 of the seat plate 10. Note that, the branch plate part 26 may be formed on the branch piece 25a side. The main plate part 21 and the branch plate part 26 are soldering parts of the auxiliary terminal 20 to a circuit board.

The auxiliary terminals 20 (20a, 20b) are separated from the hoop material 40 at the portion of the two-dot chain line DL of FIG. 6 and FIG. 7 after mounting or after injection molding within a mold, and a large portion of the branch plate part 26 is attached (embedded) to the side edge 13 of the seat plate 10 so that the surface is exposed at the time of injection molding of the seat plate 10. In this way, the auxiliary terminals 20 are respectively attached to both sides of the lead terminal housing grooves 12a and 12b on the bottom surface 10b of the seat plate 10.

When this chip type capacitor 1A is attached to a circuit board, which is not illustrated, by a reflow soldering method, for example, the lead terminals 5 and the auxiliary terminals 20 are integrally soldered to a land part of the circuit board by this molten solder. Moreover, since solder creeps up along the branch plate part 26, the lead terminals 5 and the auxiliary terminals 20 are firmly attached to the circuit board. Moreover, since flux gas generated at this time is released from the gas release grooves 24, it is possible to suppress voids and cracks from occurring in the soldering parts.

On the other hand, retaining parts 30, which suppress rattling of the capacitor main body 1, are provided on the component mounting surface 10a of the seat plate 10. In the present embodiment, the retaining parts 30 are formed as pillars 31 erected at the four corners of the seat plate 10 so as to make contact with the outer case 3. Each of the pillars 31 has a height that at least exceeds the lateral throttle grooves 7 for sealing formed on the outer case 3.

Moreover, from among the four pillars 31a to 31d, the pillars 31c and 31d on the cathode side have a height that is lower than that of the pillars 31a and 31b on the anode side, for polarity discrimination. In contrast to this, the pillars 31c and 31d on the cathode side may be higher than the pillars 31a and 31b on the anode side. By referring to FIG. 1 and FIG. 4, having two adjacent corner parts 10c and 10d of the seat plate 10 obliquely cut out is also to facilitate polarity discrimination.

Note that, as another example of the retaining parts 30, the retaining parts 30 may be a cylindrical wall that surrounds the outer case 3, under a condition that the height is a height exceeding the lateral throttle grooves 7 for sealing.

Second Embodiment (Embodiment of a Second Invention)

First, by referring to FIG. 8, a surface-mount capacitor relating to a second embodiment includes an aluminum electrolytic capacitor (hereinafter, also called a "capacitor main body") 1, and a seat plate (hereinafter, also simply called a "seat plate") 100 for surface mounting. Note that, in the second embodiment, auxiliary terminals for increasing the soldering strength are not provided on the seat plate 100.

The capacitor main body 1 is a lead same direction type (also called a discrete type) capacitor from which a pair of lead terminals 5a and 5b are led out in a same direction from a sealing part 4 of an outer case 3 with a capacitor element 2 built therein.

The outer case 3 may have a bottomed cylindrical shape made of aluminum, and an opened part of the outer case 3 is closed by a rubber sealing body 6 as the sealing part 4. It is preferable for the rubber sealing body 6 to be formed from butyl rubber. In order to improve airtightness of the sealing part 4, lateral throttle grooves 7 are formed in the circumferential direction along the rubber sealing body 6 on the outer peripheral surfaces of the outer case 3.

In this example, the lead terminal 5a is on an anode side, the lead terminal 5b is on a cathode side, and both are led out to the outside through the rubber sealing body 6. Note that, in the case where it is not necessary to distinguish the lead terminals 5a and 5b, they will be collectively called the lead terminals 5.

While the lead terminals 5 are originally round bar shaped wires, the lead terminals 5, after being led out to the outside through the rubber sealing body 6, are processed into flat band shapes by a pressing process.

Figure 9:
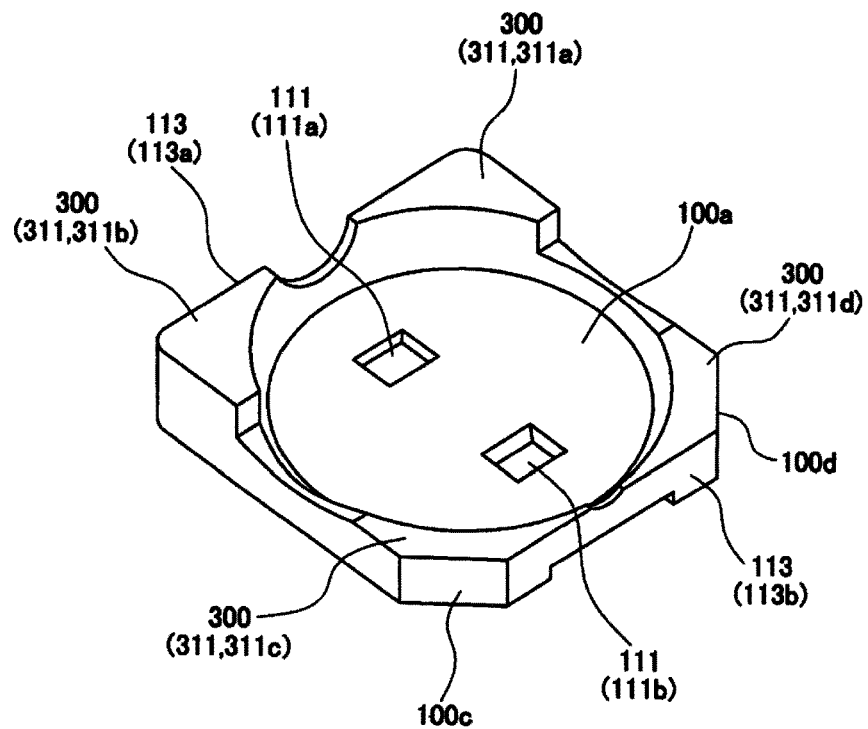
FIG. 9 is a perspective view of the seat plate for surface mounting relating to the second embodiment seen from an upper surface side.

By also referring to FIG. 9, the seat plate 100 has a square shape (deformed hexagonal shape) in which two adjacent corner parts 100c and 100d are obliquely cut off, and the entire body is formed from a heat-resistant synthetic resin. Having two adjacent corner parts 100c and 100d of the seat plate 100 obliquely cut out is also to facilitate polarity discrimination. In the second embodiment, the obliquely cut off corner parts 100c and 100d show the anode side.

A circular concave part, into which the sealing part 4 of the capacitor main body 1 is fitted, is formed on an upper surface 100a side, which is the component mounting surface of the seat plate 100. Moreover, retaining parts 300, which surround the sealing part 4 of the capacitor main body 1, are provided on the upper surface 100a side of the seat plate 100.

In the first embodiment, the retaining parts 300 are formed as pedestal parts 310 erected at four corners of the seat plate 100 so as to make contact with the sealing part 4 of the capacitor main body 1. In this case, from among the four pedestal parts 311a to 311d, the pedestal parts 311a and 311b on the cathode side have a height that is higher than that of the pedestal parts 311c and 311d on the anode side, for polarity discrimination. In contrast to this, the pedestal parts 311c and 311d on the anode side may be higher than the pedestal parts 311a and 311b on the cathode side.

A pair of lead terminal insertion holes 111a and 111b, through which the lead terminals 5a and 5b are inserted, are bored into the seat plate 100. Note that, in the case where it is not necessary to distinguish the lead terminal insertion holes 111a and 111b, they will be collectively called the lead terminal insertion holes 111.

Figure 10:
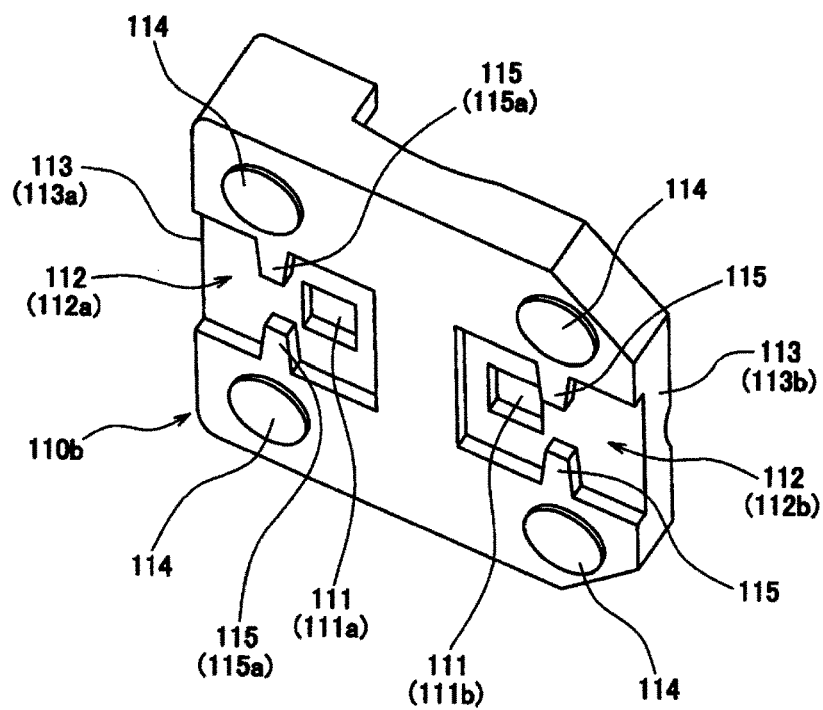
FIG. 10 is a perspective view of the seat plate for surface mounting relating to the second embodiment seen from a bottom surface side.

As shown in FIG. 10, lead terminal housing grooves 112a and 112b, which extend from each of the lead terminal insertion holes 111a and 111b to opposite side surfaces 113a and 113b of the seat plate 100 in opposite directions away from each other, are formed on the bottom surface 100b of the seat plate 100. Moreover, disk shaped spacers 114, which maintain the seat plate 100 at a prescribed height from a circuit board, which is not illustrated, at the time of mounting on the circuit board, are formed at four corners on the bottom surface 110b of the seat plate 100.

In the case where it is not necessary to distinguish the lead terminal housing grooves 112a and 112b, they will be collectively called the lead terminal housing grooves 112. Moreover, in the case where it is not necessary to distinguish the side edges 113a and 113b, they will be collectively called the opposite side edges 113.

The capacitor main body 1 is placed on the upper surface (component mounting surface) 100a of the seat plate 100, while inserting the lead terminals 5a and 5b into the lead terminal insertion holes 111a and 111b, and thereafter the lead terminals 5a and 5b are housed within the lead terminal housing grooves 112a and 112b by being bent in opposite directions away from each other. Therefore, the capacitor main body 1 can be set as a surface-mount capacitor 1A that can be surface mounted on a circuit board.

While, in a lot of cases, mounting to the circuit board is performed by reflow soldering, at this time, flux gas (gasified flux) is generated, and there may be cases where voids or cracks occur due to flux gas remaining in a fillet.

Moreover, there may be cases where solder paste applied to a solder land part is pushed to the outside of the solder land part by the generated flux gas, becomes spherical due to heat at the time of soldering, solidifies into a solder ball, and adheres, for example, to a solder mask (also called a solder resist or the like) or to the seat plate.

Moreover, as another example rather than the one resulting from flux gas, at the time of mounting to a circuit board, there may be cases where solder paste applied to a solder land part is crushed by the lead terminals, the area of this crushed part expands, solder does not return to the solder land part when melted due to heat at the time of soldering, and remains as a solder ball outside the solder land part.

Figure 11:
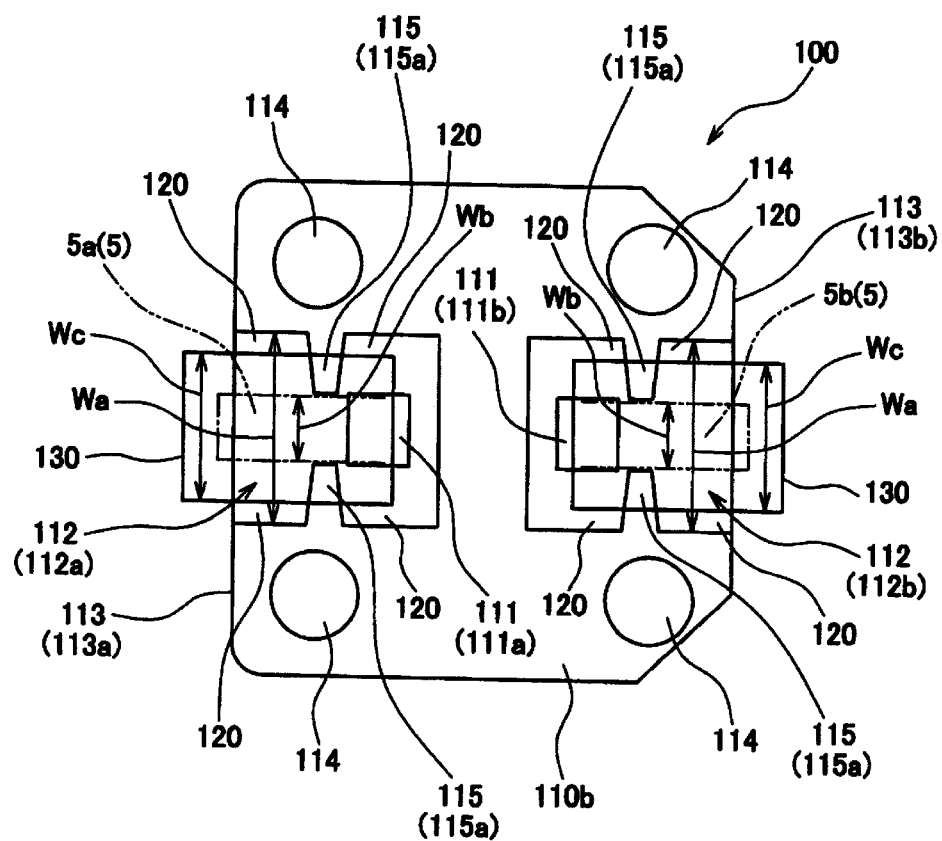
FIG. 11 is a bottom view of the seat plate for surface mounting relating to the second embodiment, and is a view for describing the relationship of the width dimensions of lead terminals, lead terminal housing grooves, and a solder land part.
Figure 12:
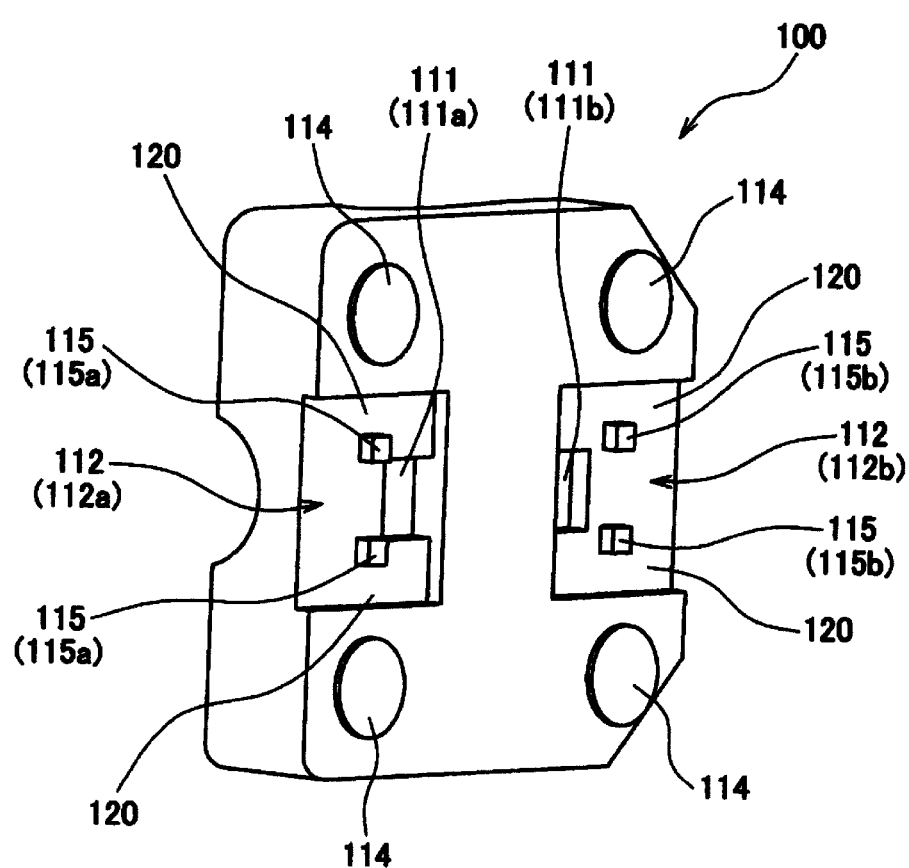
FIG. 12 is a perspective view seen from a bottom surface side showing a different embodiment of the seat plate for surface mounting relating to the second embodiment.

In order to prevent such an undesirable phenomenon, in the second embodiment, such as shown in FIG. 11, the lead terminal housing grooves 112 (112a, 112b) include widened width parts 120 for forming prescribed gaps (clearances) on both sides of the lead terminals 5 (5a, 5b) that are greater than the width of the lead terminals (5a, 5b).

Namely, a direction orthogonal to the extension direction of the lead terminal housing grooves 112 (a direction from one side surface 113a to the other side surface 113b, or from the other side surface 113b to the one side surface 113a) is set as a width direction, and a width Wa of each of the lead terminal housing grooves 112 is greater than a width Wb of each of the lead terminals 5. Therefore, a widened width part 120 having a width of (Wa−Wb)/2 is provided on both sides of each of the lead terminals 5.

While the width Wa of the lead terminal housing grooves 112 may be greater than the width Wb of the lead terminals 5, if the width Wa of the lead terminal housing grooves 112 is too wide, the strength of the seat plate itself is lowered, and there is the risk, for example, of being deformed at the time of reflow soldering.

Accordingly, in order to achieve both the ease of release of flux gas and the strength of the seat plate itself, the width Wa of the lead terminal housing grooves 112 is preferably 200% to 400% of the width Wb of the lead terminals 5, more preferably 200% to 300%, and in particular, it is preferable for deformations, such as warping of the seat plate, to not be observed at the time of reflow soldering to the circuit board.

For the following examples (Comparative Examples 1-4, Examples 1 and 2 of the present invention), which have a surface-mount capacitor for a vehicle as a test product, reflow soldering was actually performed, and each item of a solder ball generation number, a presence or absence of deformation at the time of heating, a seat plate strength, and a productivity (presence or absence of seat plate deformation at the time of assembly), were investigated. The number of test products was 30 in each example.

Comparative Example 1

The width Wa of the lead terminal housing grooves 112 was set to 100% of the width Wb of the lead terminals 5.
Solder ball generation number: average of 3.8 per one product
Presence or absence of deformation at time of heating: none
Seat plate strength: pass
Productivity (presence or absence of deformation of seat plate at time of assembly): good productivity with no deformation Comparative Example 2

The width Wa of the lead terminal housing grooves 112 was set to 150% of the width Wb of the lead terminals 5.
Solder ball generation number: average of 2.3 per one product
Presence or absence of deformation at time of heating: none
Seat plate strength: pass
Productivity (presence or absence of deformation of seat plate at time of assembly): good productivity with no deformation Comparative Example 3

The width Wa of the lead terminal housing grooves 112 was set to 180% of the width Wb of the lead terminals 5.
Solder ball generation number: average of 1.1 per one product
Presence or absence of deformation at time of heating: none
Seat plate strength: pass
Productivity (presence or absence of deformation of seat plate at time of assembly): good productivity with no deformation Example 1

The width Wa of the lead terminal housing grooves 112 was set from 200% to 300% of the width Wb of the lead terminals 5.
Solder ball generation number: solder ball generation number was 0 for 30 products.
Presence or absence of deformation at time of heating: none
Seat plate strength: pass
Productivity (presence or absence of deformation of seat plate at time of assembly): good productivity with no deformation Example 2

The width Wa of the lead terminal housing grooves 112 was set from 301% to 400% of the width Wb of the lead terminals 5.
Solder ball generation number: solder ball generation number was 0 for 30 products.
Presence or absence of deformation at time of heating: no deformation to the extent of having an influence on the soldering strength.
Seat plate strength: pass
Productivity (presence or absence of deformation of seat plate at time of assembly): good productivity with no deformation to the extent of having an influence on the productivity.

Comparative Example 4

The width Wa of the lead terminal housing grooves 112 exceeded 400% of the width Wb of the lead terminals 5.
Solder ball generation number: solder ball generation number was 0 for 30 products.
Presence or absence of deformation at time of heating: strength of the seat plate was reduced, and deformation, while small, was observed at the time of heating.
Seat plate strength: failed
Productivity (presence or absence of deformation of seat plate at time of assembly): not good productivity with deformation
These results are shown in the following Table 1.

TABLE 1

| Seat plate groove width | Solder ball generation number | Deformation at time of heating | Seat plate strength | Productivity (not good rate) |
|---|---|---|---|---|
| Comparative Example 1 (100%) | 3.8 | None ⊚ | Pass | Good |
| Comparative Example 2 (150%) | 2.3 | None ⊚ | Pass | Good |
| Comparative Example 3 (180%) | 1.1 | None ⊚ | Pass | Good |
| Example 1 (200% to 300%) | 0 | None ⊚ | Pass | Good |
| Example 2 (301% to 400%) | 0 | *1 None ○ | Pass | *2 Good |
| Comparative Example 4 (more than 401%) | 0 | Small Δ | Failed | Not good |

Moreover, in order to allow flux gas to escape from the bottom surface 100b of the seat plate 100, it is preferable for the widened width parts 120 to be formed from base ends of the lead terminal insertion hole 111 sides to the side edges 113 of the seat plate 100.

In FIG. 11, while the reference numeral 130 is a solder land part formed on the circuit board side for soldering the lead terminals 5, the width Wa of the lead terminal housing grooves 112 is greater than a width Wc of the solder land part 130.

According to this, at the time of mounting to the circuit board, even if solder paste applied to the solder land part 130 is crushed by the lead terminals 5, and the area is wide, it remains within the widened width parts 120. Therefore, solder balls are not generated on a solder mask or the bottom surface of the seat plate 100.

As described above, if the width Wa of the lead terminal housing grooves 112 is greater than the width Wb of the lead terminals 5, there is the risk that the directions will deviate when the lead terminals 5a and 5b are bent in opposite directions away from each other and housed within the lead terminal housing grooves 112, and the lead terminals 5a and 5b will not line up in a straight line.

Accordingly, in the second embodiment, the lead terminal housing grooves 112 each include a pair of direction restricting means (guide means) 115 in an intermediate portion from a base end of the lead terminal insertion hole 111 side to the side edge 113 of the seat plate 100 side, the pair of direction restricting means 115 has one of the lead terminals 5 fitted therebetween and restricts (guides) the extension direction of the lead terminal 5. In the description of the second embodiment, the following two aspects are included for the direction restricting means 115.

First, the direction restricting means 115 relating to a first aspect are each made of an overhanging arm 115a formed in a protruding shape from an inner edge of the lead terminal housing grooves 112 to inside the groove, such as shown in FIG. 10 and FIG. 11.

Next, the direction restricting means 115 relating to a second aspect are each made of a columnar projection (boss) 115b formed in an island shape within the lead terminal housing grooves 112.

Note that, anything other than the overhanging arms 115a and columnar projections 115b can be adopted as the direction restricting means 115, as long as the lead terminals 5a and 5b are arranged in a straight line, without obstructing the release of flux gas.

Third Embodiment (Embodiment of a Third Invention)

First, by referring to FIG. 13, a surface-mount capacitor relating to a third embodiment includes an aluminum electrolytic capacitor (hereinafter, also called a "capacitor main body") 1, and a seat plate (hereinafter, also simply called a "seat plate") 100 for surface mounting.

The capacitor main body 1 is a lead same direction type (also called a discrete type) capacitor from which a pair of lead terminals 5a and 5b are led out in a same direction from a sealing part 4 of an outer case 3 with a capacitor element 2 built therein.

The outer case 3 may have a bottomed cylindrical shape made of aluminum, and an opened part of the outer case 3 is closed by a rubber sealing body 6 as the sealing part 4. It is preferable for the rubber sealing body 6 to be formed from butyl rubber. In order to improve airtightness of the sealing part 4, lateral throttle grooves 7 are formed in the circumferential direction along the rubber sealing body 6 on the outer peripheral surfaces of the outer case 3.

In this example, the lead terminal 5a is on a cathode side, the lead terminal 5b is on an anode side, and both are led out to the outside through the rubber sealing body 6. Note that, in the case where it is not necessary to distinguish the lead terminals 5a and 5b, they will be collectively called the lead terminals 5.

While the lead terminals 5 are originally round bar shaped wires, the lead terminals 5, after being led out to the outside through the rubber sealing body 6, are processed into flat band shapes by a pressing process.

Figure 14:
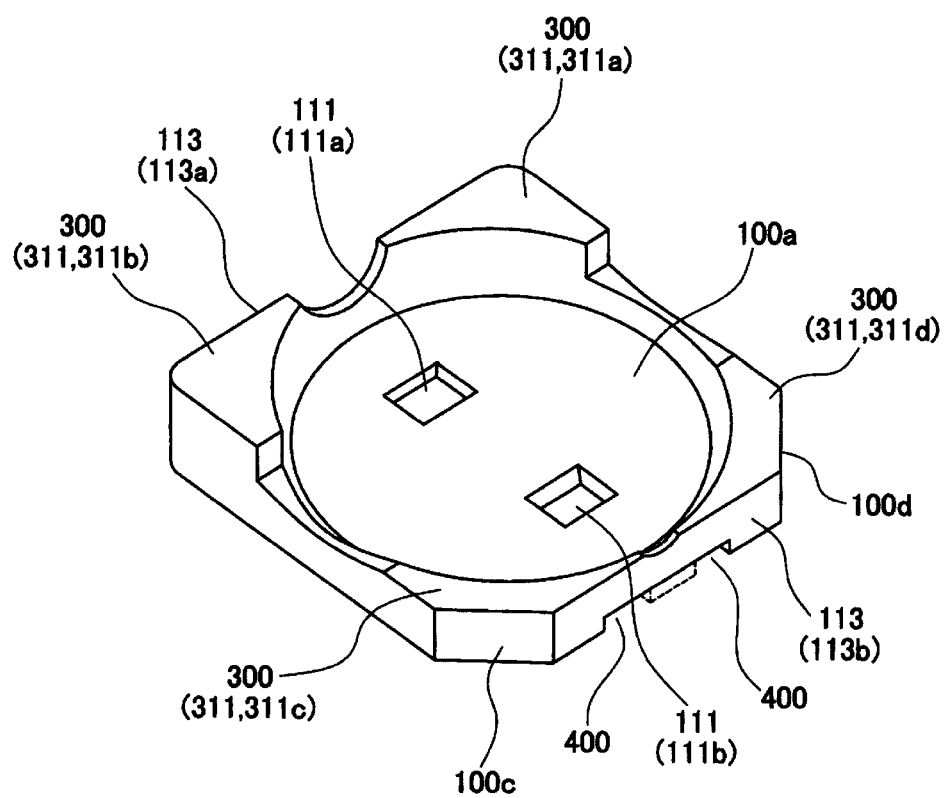
FIG. 14 is a perspective view of the seat plate for surface mounting relating to the third embodiment seen from an upper surface side.

By also referring to FIG. 14, the seat plate 100 has a square shape (deformed hexagonal shape) in which two adjacent corner parts 100c and 100d are obliquely cut off, and the entire body is formed from a heat-resistant synthetic resin. Having two adjacent corner parts 100c and 100d of the seat plate 100 obliquely cut out is also to facilitate polarity discrimination. In the present embodiment, the obliquely cut off corner parts 100c and 100d show the anode side.

A circular concave part, into which the sealing part 4 of the capacitor main body 1 is fitted, is formed on an upper surface 100a side, which is the component mounting surface of the seat plate 100. Moreover, retaining walls 300, which surround the sealing part 4 of the capacitor main body 1, are provided on the upper surface 100a side of the seat plate 100.

In the present embodiment, the retaining walls 300 are formed as pedestal parts 311 erected at four corners of the seat plate 100 so as to make contact with the sealing part 4 of the capacitor main body 1. In this case, from among the four pedestal parts 311a to 311d, the pedestal parts 311a and 311b on the cathode side have a height that is higher than that of the pedestal parts 311c and 311d on the anode side, for polarity discrimination. In contrast to this, the pedestal parts 311c and 311d on the anode side may be higher than the pedestal parts 311a and 311b on the cathode side.

A pair of lead terminal insertion holes 111a and 111b, through which the lead terminals 5a and 5b are inserted, are bored into the seat plate 100. Note that, in the case where it is not necessary to distinguish the lead terminal insertion holes 111a and 111b, they will be collectively called the lead terminal insertion holes 111.

Figure 15A:
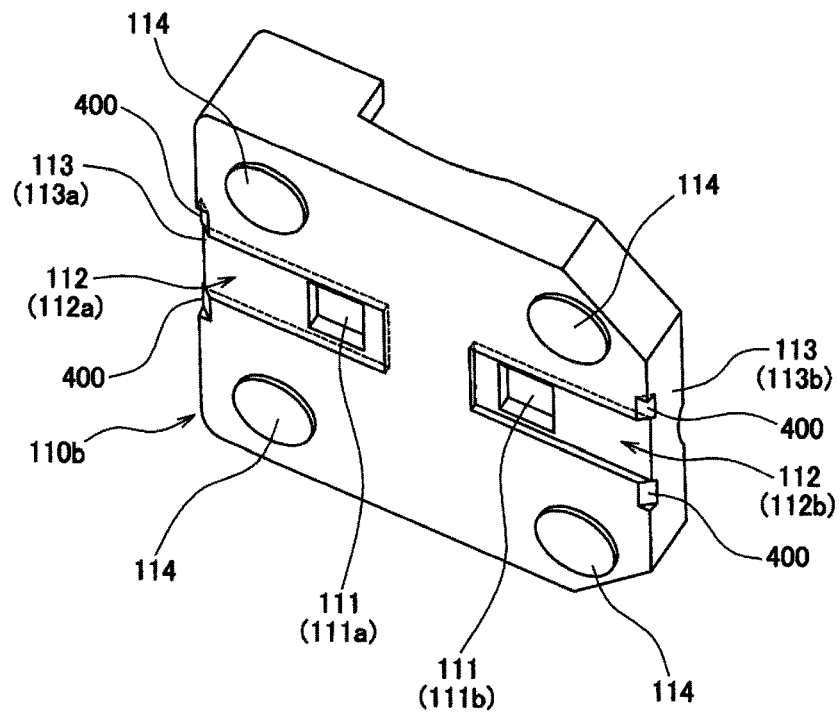
FIG. 15a is a perspective view of the seat plate for surface mounting relating to the third embodiment seen from a bottom surface side.

As shown in FIG. 15a, lead terminal housing grooves 112a and 112b, which extend from each of the lead terminal insertion holes 111a and 111b to opposite side surfaces 113a and 113b of the seat plate 100 in opposite directions away from each other, are formed on the bottom surface 110b of the seat plate 100. Moreover, disk shaped spacers 114, which maintain the seat plate 100 at a prescribed height from a circuit board, which is not illustrated, at the time of mounting on the circuit board, are formed at four corners on the bottom surface 110b of the seat plate 100.

In the case where it is not necessary to distinguish the lead terminal housing grooves 112a and 112b, they will be collectively called the lead terminal housing grooves 112. Moreover, in the case where it is not necessary to distinguish the opposite side surfaces 113a and 113b, they will be collectively called the opposite side surfaces 113. Note that, while the seat plate 100 includes two other opposite side surfaces, in addition to the side surfaces 113a and 113b, in the present embodiment, no processing is applied to the two other opposite side surfaces.

The capacitor main body 1 is placed on the upper surface (component mounting surface) 100a of the seat plate 100, while inserting the lead terminals 5a and 5b into the lead terminal insertion holes 111a and 111b, and thereafter the lead terminals 5a and 5b are housed within the lead terminal housing grooves 112a and 112b by being bent in opposite directions away from each other. Therefore, the capacitor main body 1 can be set as a surface-mount capacitor 1A that can be surface mounted on a circuit board.

In a lot of cases, mounting of the surface-mount capacitor 1A to the circuit board (not illustrated) is performed by reflow soldering. Namely, cream solder is applied to a solder land part formed on the circuit board, and after the lead terminals 5a and 5b of the surface-mount capacitor 1A are placed thereon, the cream solder is melted and soldered by heating within a heating furnace.

However, since the lead terminals 5a and 5b are on the bottom surface 100b side of the seat plate 100, it will be difficult to visually observe from the outside whether soldering has been performed satisfactorily.

Figure 15B:
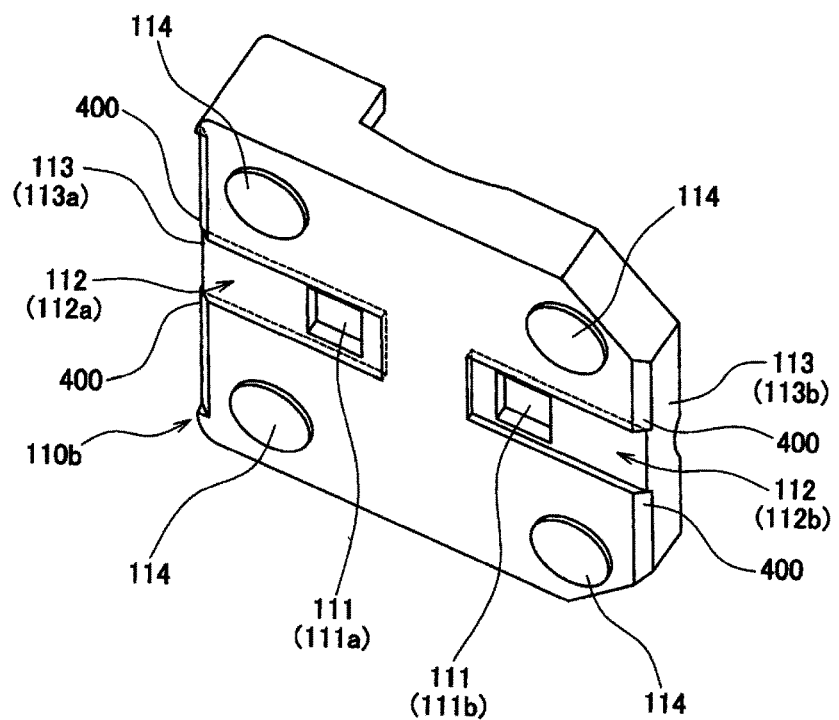
Figure 16:
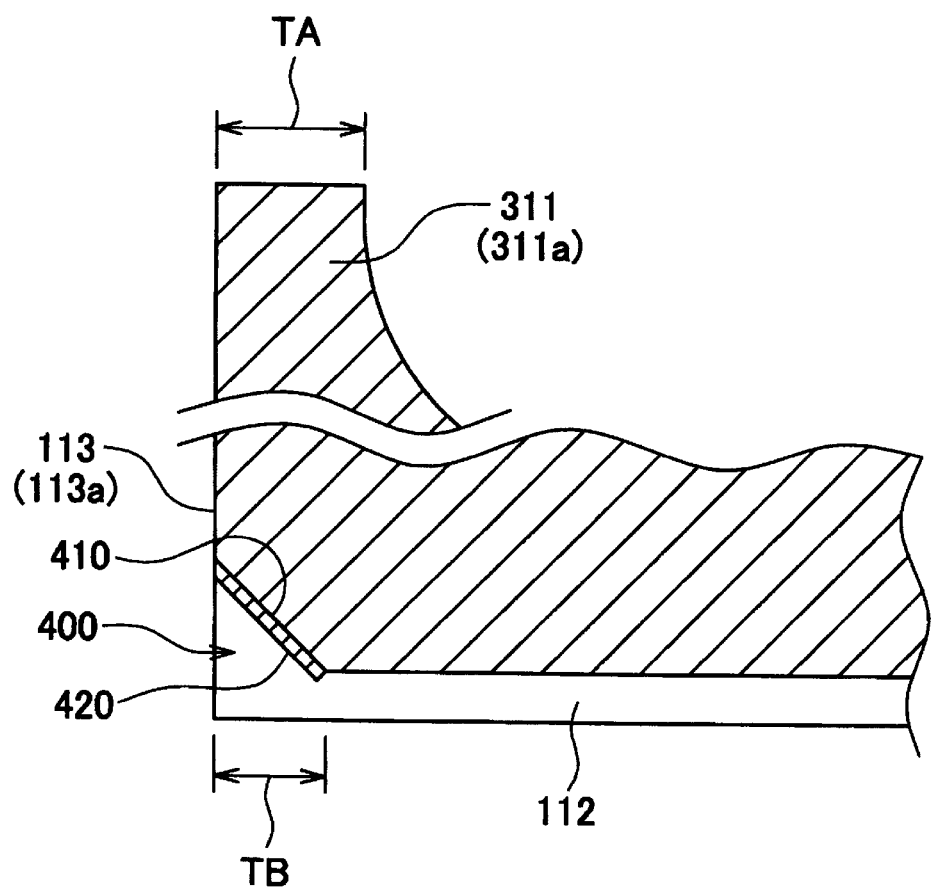
FIG. 16 is a cross-section view enlarging a portion of a soldering auxiliary part from within the seat plate relating to the third embodiment.

By referring to FIG. 15 to FIG. 17, in the third embodiment, soldering auxiliary parts 400, which allow a soldered state to be visually observed from the outside, are provided adjacent to the end parts of the lead terminal housing grooves 112.

In the third embodiment, as shown in FIG. 15a, the soldering auxiliary parts 400 are provided at a total of four locations, which are two locations on both the left and right sides of the end part of the side surface 113a side of one lead terminal housing groove 112a, and two locations on both the left and right sides of the end part of the side surface 113b side of the other lead terminal housing groove 112b.

While these soldering auxiliary parts 400 may have the same configuration, the configuration of each of the soldering auxiliary parts 400 may be individually changed in accordance with, for example, the shape of a solder land part on the circuit board side. Moreover, as shown in FIG. 15b, the soldering auxiliary parts 400 may be formed across the entire width on the lower end edges of the side surfaces 113 of the seat plate 100.

While the soldering auxiliary parts 400 are provided on the lower end edges of the side surfaces 113 of the seat plate 100, it is preferable to include inclined surfaces 410 formed from the side surfaces 113 to the bottom surface 100b of the seat plate 100. In the aspect shown in FIG. 17a, the inclined surfaces 410 are formed from a middle portion of the side surface 113 of the seat plate 100 to the bottom surface 110b, and as shown in FIG. 17b, they may be formed from an upper edge of the side surface 113 of the seat plate 100 to the bottom surface 110b.

Figure 17A:
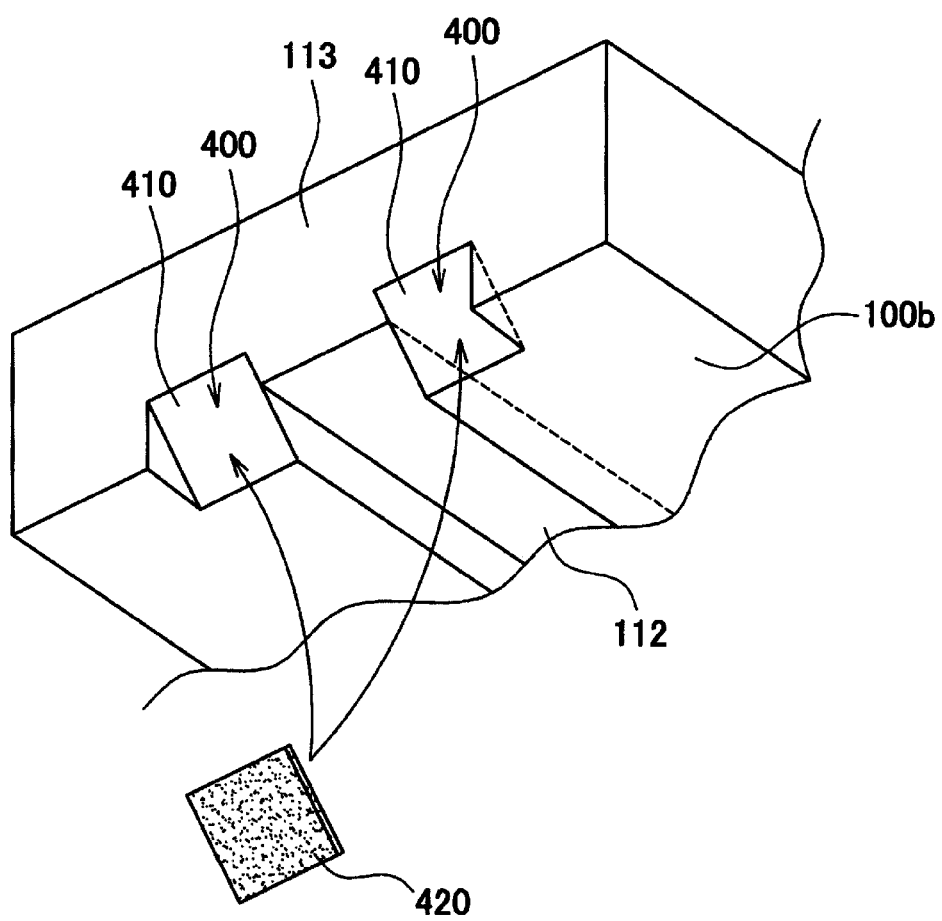
FIG. 17a is a perspective view of a portion of soldering auxiliary parts relating to the third embodiment seen from a bottom surface side.
Figure 17B:
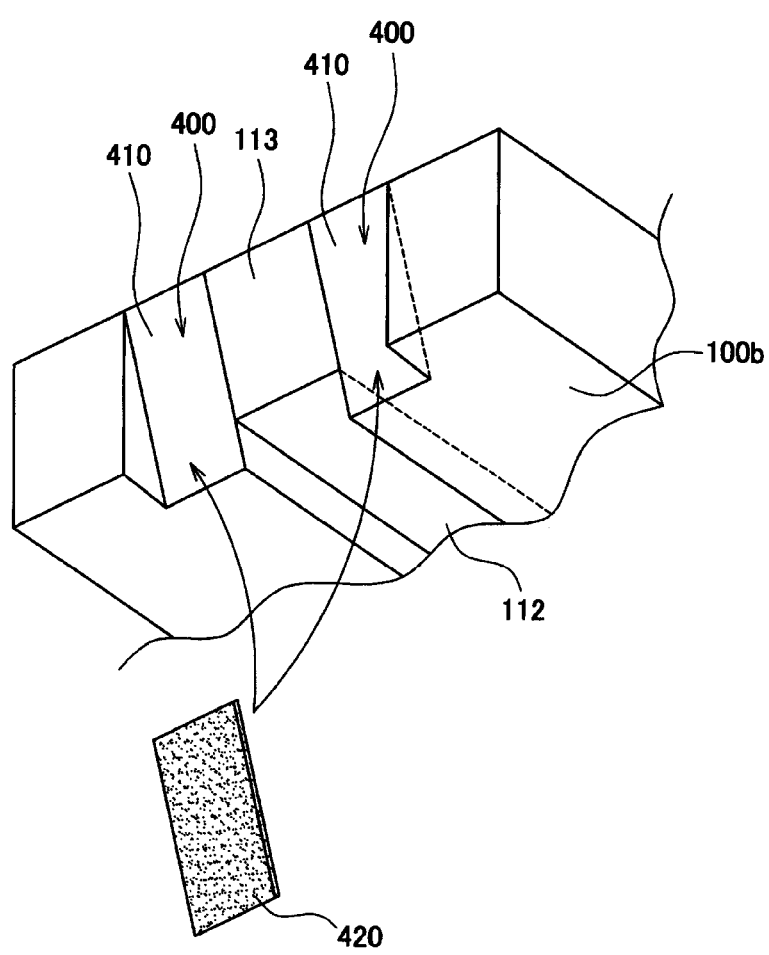

Moreover, as shown in FIGS. 17a and 17b, while it is preferable for the inclined surfaces 410 to be spatially connected to the end parts of the lead terminal housing grooves 112, they may be formed separated away from the lead terminal housing grooves 112.

A solderable metal material 420 is provided on the inclined surfaces 410. The metal material 420 may be formed by vapor disposition, plating, or a metal plate. As a preferred aspect, iron, brass, nickel, titanium, copper, tin, or an alloy thereof is used for the metal material 420.

In the case where a metal plate is used as the metal material 420, while the metal plate is fixed to each of the inclined surfaces 410 by an adhesive or embedding, by including the cases of vapor disposition and plating, it is preferable for the inclined surfaces 410 to be roughened to improve adhesion with the metal material 420.

Moreover, it is preferable for an angle of each of the inclined surfaces 410 with respect to a flat plane including the bottom surface 100b of the seat plate 100 to be from 45 degrees to 80 degrees. By providing the inclined surfaces 410, accordingly, the strength of the seat plate 100 are reduced. Therefore, there is the risk of cracks or chips occurring in the seat plate 100, for example, at the time of mounting to the capacitor main body 1 or the like.

In order to prevent this, the following measures are taken in the third embodiment. As described above, the seat plate 100 includes substantially annular retaining walls 300, into which the capacitor main body 1 is fitted, on the upper surface 100a thereof.

By referring to FIG. 16, in one of the retaining walls 300, a wall thickness of a wall portion (pedestal part 311 in the present embodiment) positioned above the inclined surface 410 is set to TA, a projection width of the inclined surface 410 in a plane view is set to TB, and TB<TA. Therefore, cracks or chips do not occur in the seat plate 100, for example, at the time of mounting to the capacitor main body 1.

According to the third embodiment, since the soldering auxiliary parts 400, which have a metal material 420 and allow a soldered state to be visually observed from outside, are arranged adjacent to the end parts of the lead terminal housing grooves 112 on the lower end edges of the side surfaces 113 of the seat plate 100, a judgment can be performed for the quality of soldering by the attachment condition to the soldering auxiliary parts 400, for example, at the time of reflow soldering. Moreover, since the soldering auxiliary parts 400 are soldered to a solder land part of the circuit board, accordingly, the soldering strength are increased.

Heretofore, while the present invention has been described by using embodiments, the technical scope of the present invention is not limited to the description of the embodiments. Modifications or improvements added to the embodiments by a person skilled in the art are included in the technical scope of the present invention.

REFERENCE SIGNS LIST 1 capacitor main body
1A chip type capacitor (surface-mount capacitor)
2 capacitor element
3 outer case
4 sealing part
5 (5a, 5b) lead terminal
6 rubber sealing body
7 lateral throttle groove
10 seat plate
10a component mounting surface
10b bottom surface
11 (11a, 11b) lead terminal insertion hole
12 (12a, 12b) lead terminal housing groove
13 (13a, 13b) side edge
20 (20a, 20b) auxiliary terminal
21 main plate part
22 flange piece
23 anchor piece
24 gas release groove
26 branch plate part
30 retaining part
31 (31a-31d) pillar
100 seat plate
100a seat plate upper surface (component mounting surface)
100b seat plate bottom surface
111 (111a, 111b) lead terminal insertion hole
112 (112a, 112b) lead terminal housing groove
113 (113a, 113b) side surface
114 spacer
115 direction restricting means 115a overhanging arm
115b columnar projection
120 widened width part
300 retaining part
311 (311a-311d) pedestal part
400 soldering auxiliary part
410 inclined surface
420 metal material
Wa lead terminal housing groove width
Wb lead terminal width
Wc solder land part width

The invention claimed is:

1. A surface-mount capacitor comprising a capacitor main body from which a pair of lead terminals are led out in a same direction from a sealing part of a bottomed cylindrical outer case with a capacitor element built therein, and a synthetic resin seat plate mounted on a sealing part side of the outer case, wherein
the seat plate has a pair of lead terminal insertion holes through each of which one of the lead terminals is inserted, lead terminal housing grooves extending from each of the lead terminal insertion holes to opposite side edges of the seat plate in opposite directions away from each other are formed on a bottom surface of the seat plate, and auxiliary terminals that are integrated with the lead terminals at the time of soldering are embedded along each of the lead terminal housing grooves,
each of the lead terminals is inserted into one of the lead terminal insertion holes, a distal portion of each of the lead terminals is housed within one of the lead terminal housing grooves by being bent, and is soldered at a prescribed position of a circuit board together with one of the auxiliary terminals, and
a gas release groove for releasing flux gas generated at the time of the soldering is formed on each of the auxiliary terminals.

2. The surface-mount capacitor according to claim 1, wherein the auxiliary terminals each comprise a main plate part as a soldering part to the circuit board, the main plate part being attached to the bottom surface of the seat plate by leaving a surface portion at the time of resin molding of the seat plate, and a branch plate part connected to the main plate part and attached to a side edge of the seat plate.

3. The surface-mount capacitor according to claim 1, wherein the gas release grooves are each formed from a central portion of the main plate part to a side edge of the seat plate.

4. The surface-mount capacitor according to claim 3, wherein an area occupied by each of the gas release grooves in the main plate part is 10% to 65% of an area of the main plate part before the gas release groove has been formed.

5. The surface-mount capacitor according to claim 1, wherein a retaining part having a height exceeding a lateral throttle groove for sealing formed on the outer case is formed on a component mounting surface side of the seat plate.

* * * * *